UNITED STATES PATENT OFFICE.

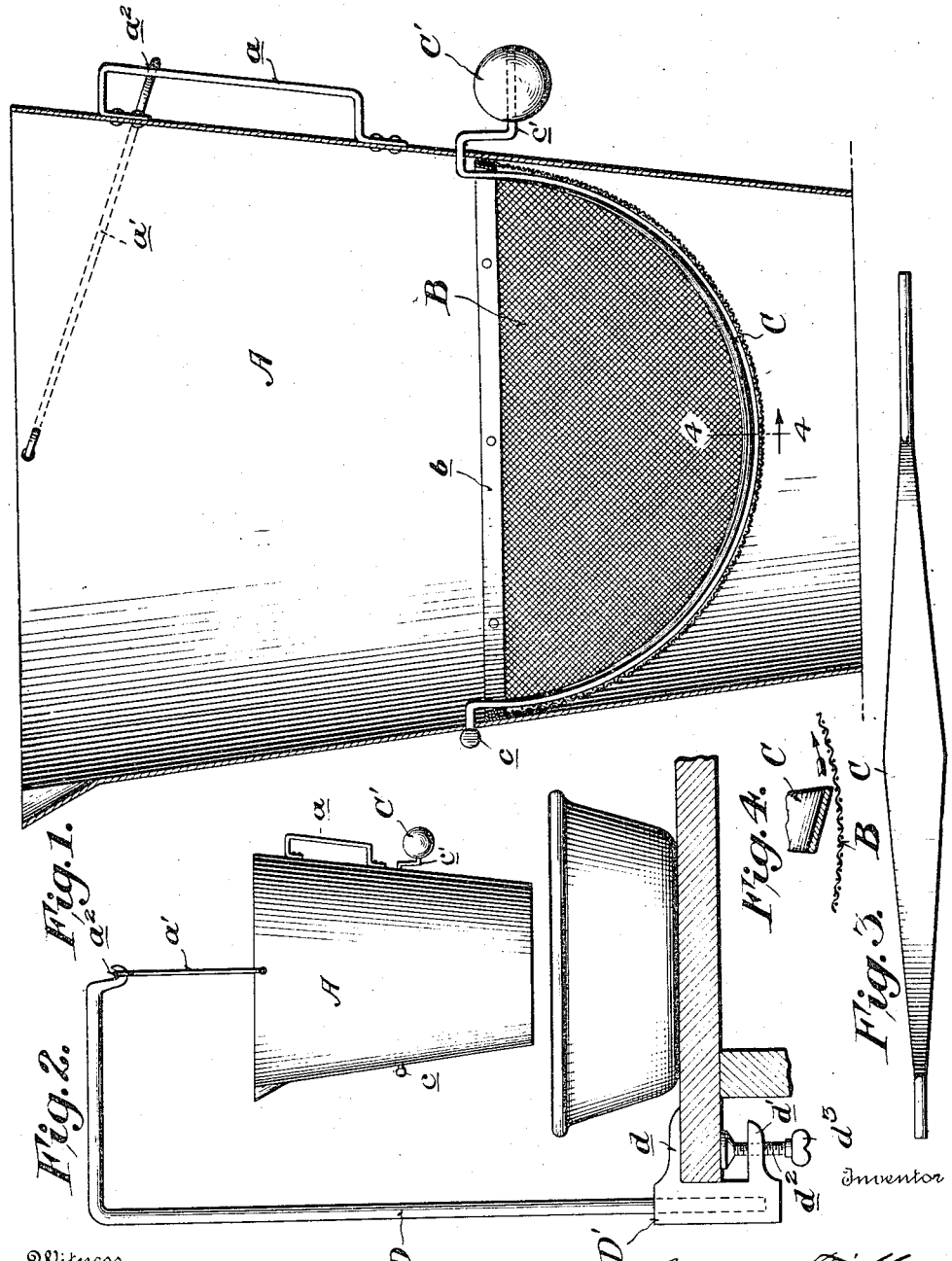

REBA RUMFORD TILTON, OF WASHINGTON, DISTRICT OF COLUMBIA.

FRUIT-STRAINER.

1,285,470.  Specification of Letters Patent.  Patented Nov. 19, 1918.

Application filed November 6, 1917. Serial No. 200,578.

*To all whom it may concern:*

Be it known that I, REBA RUMFORD TILTON, a citizen of the United States, residing at Washington, in the District of Columbia, have invented certain new and useful Improvements in Fruit-Strainers; and I do hereby declare the following to be a full, clear, and exact description of the invention, such as will enable others skilled in the art to which it appertains to make and use the same.

This invention relates to strainers and more particularly to fruit strainers used in making jelly and wine and the like.

The object of the invention is to provide a simple, inexpensive and efficient device of the character referred to, adapted for use in straining fruit in the making of jelly, wine, etc., whereby the user may strain the fruit and extract the juices more thoroughly and in much less time than is required by present methods of straining through a cheese-cloth, which is usually suspended over night to allow the juices to drip through the cloth into a pan placed below the suspended cheese-cloth.

The invention will first be hereinafter more particularly described, with reference to the accompanying drawings, which are to be taken as a part of this specification, and then pointed out in the claims at the end of the description.

In said drawings:

Figure 1 represents a vertical sectional elevation of a fruit strainer embodying my invention.

Fig. 2 is a side elevation of the same suspended from a supporting device attached to the edge of a table.

Fig. 3 is a detail plan view of the revoluble paddle detached, and

Fig. 4 is a detail cross-section taken on the line 3—3, Fig. 4.

Referring to said drawings, in which the same reference letters are used to denote corresponding parts in different views, the letter A denotes a bottomless vessel of conical form enlarging toward its upper end, and having a fixed handle $a$, and a swinging handle or bail $a'$ pivotally secured thereto at its upper end and having its free extremity bent to form a recess $a^2$ adapted to engage a hook on the free end of a supporting device whereby the strainer may be suspended over a receptacle lying upon a table or placed on the floor or a chair beside the table to which said support is attached, as hereinafter described. Within the vessel A is secured a substantially semi-spherical sieve B, around the upper edge of which is secured a flat metallic strip $b$ of tin or the like, through which and through registering apertures in the sides of the can or vessel A are passed fastening bolts or rivets whereby the sieve is secured in a fixed position within the vessel A in such manner that no obstruction is presented on which fruit may lodge when the strainer is in use. The letter C denotes a revoluble stirrer-blade or paddle which diminishes in width from an intermediate point toward both ends, and is curved to conform to the contour of the curved bottom of the sieve B, and move close to but without touching the surface thereof. Its intermediate portion is flattened and shaped to present a dull edge in the direction in which it moves, and said flattened portion is slightly inclined upwardly and rearwardly with respect to the direction of rotation so that when rotated with the lowermost edge foremost, it will not push and crush the fruit, as is usual in using paddles of ordinary construction, such as are used in sifting flour and the like, but will take under the fruit and slightly raise and turn the fruit very much as if raised and turned over by hand, whereby the extraction of the juices is facilitated and a rapid flow effected, clear and free of sediment, which is liable to form and pass through the meshes of the sieve when the fruit is pushed and crushed by stirrers of the flour-sieve type. The stirrer-blade or paddle C may be formed by flattening out the intermediate portion of a metal rod or bar, and one end thereof is passed through an aperture in one side of the vessel A and then upset as at $c$, so as to form a knob to prevent its withdrawal, while the other end is passed through an aperture directly opposite the end $c$ and bent to form a crank handle $c'$ on which may be secured a wooden sleeve or ball $C^1$ to form a wooden handle revolubly fitted on said crank handle, though the wooden sleeve is not essential and may be dispensed with. The vessel A may be constructed of sheet metal, tin, aluminum, or other suitable material, and of sufficient size to hold a comparatively large quantity of fruit, and, as will be observed, the interior thereof is entirely free from obstructions on which fruit may lodge, so that the device may not become clogged and may be easily cleaned and kept clean ready for use as desired from time to time.

In order to suspend a large or a small vessel or cooking utensil over a receptacle lying on a table to which the supporting device is attached or directly over a receptacle placed on the floor or on a chair beside the table, I provide a supporting device D, which consists of an inverted L-shaped rod or bar having the lower end of its longer upright arm revolubly fitted in a socket formed in the body of a clamping device $D^1$ which may be attached to a table on or beside which a vessel may be placed to receive the juices from the strainer suspended over such vessel. The clamp D has two lateral arms $d$ and $d'$, the latter of which is apertured to receive a threaded bolt $d^2$ having a head $d^3$ between which and the upper arm of the clamp the edge of the table may be clamped, as shown in Fig. 2, for securing the supporting device thereto. By means of such supporting device the strainer may be suspended directly over a receptacle lying on the table, or by turning the hooked end of the supporting rod half way around from the position shown in full lines in Fig. 2, the strainer may be supported directly over a receptacle lying on the floor or placed on a chair beside the table.

It will be understood of course that my improved strainer is designed and adapted for use in straining various kinds of fruit, in the making of all kinds of jellies, wines, catsup, cottage cheese, and the like.

Having thus described my invention, what I claim as new and desire to secure by Letters Patent of the United States is:

1. A fruit strainer comprising a bottomless vessel having a concave sieve therein, the concavity of said sieve being turned upward, and a revoluble stirrer blade or paddle arranged to swing within and curved to conform to the contour of said sieve; said blade being flat and widest at an intermediate point from which it diminishes in width toward both ends, each end protruding through an aperture in the vessel and one end bent to form an operating handle on the outer side of said vessel.

2. A fruit strainer comprising a vessel having an open bottom, a concave sieve above said bottom having its concavity turned upward, an agitating device consisting of a flat substantially semi-circular blade arranged to swing from side supports edgewise over the surface of said sieve at an acute angle thereto, transversely of its length, so as to take under and overturn the material in the sieve, and a handle protruding through one side of the vessel for swinging said blade.

In testimony whereof I affix my signature in the presence of two witnesses.

REBA RUMFORD TILTON.

Witnesses:
CHAS. E. RIORDON.
E. W. STERZER.

Copies of this patent may be obtained for five cents each, by addressing the "Commissioner of Patents, Washington, D. C."